United States Patent Office 3,391,100
Patented July 2, 1968

3,391,100
POLYCHLOROPRENE CEMENT
Dominic C. Mitchell, Jr., Arcadia, Calif., assignor to North American Rockwell Corporation, a corporation of Delaware
No Drawing. Filed Nov. 4, 1964, Ser. No. 408,731
19 Claims. (Cl. 260—31.2)

ABSTRACT OF THE DISCLOSURE

A single component solvent type polychloroprene cement is described comprising a polychloroprene gum free of sulphur and other accelerators, magnesium oxide, and zinc oxide dissolved and suspended in toluene. The cement may also contain an anti-oxidant. Good adhesion to many substrates is achieved without the use of accelerators, retarders, resins, and other processing aids by means of grinding the cement in a ball mill for at least three days.

---

This invention relates to a single component solvent type polychloroprene cement. The term cement includes coatings, adhesives, and dispersions wherein a chloroprene polymer is dissolved or dispersed in a non-aqueous solvent.

In prior art cements compromise physical properties have been obtained by including many materials in the composition. Thus, for example, accelerators are added to a basic polychloroprene gum to effect a cure of the cement in a short time. The addition of an accelerator causes the cement to gel during storage; therefore, retarders are added which minimize the curing under one set of conditions and have a minimum effect on cure under other conditions. Both the accelerators and retarders lower the desirable properties of the cured cement; therefore, reinforcing agents are added to bring the strength up to acceptable values. The reinforcing agents give reasonable strength, but decrease the tack of the cement; therefore, resins are added to make the cement sticky again. The resins make the cement brittle at low temperatures and limit the high temperature resistance of the material. The net result of the combination of accelerators, retarders, reinforcing agents, resins and other processing aids to polychloroprene cements is that the cement is limited in its applicability. Thus, single component cements cannot withstand both high and low temperatures although formulas can be made for either. Conventional solvent type cements do not offer the alternative of either a room temperature cure or a high temperature cure for a given composition. That is, conventional cements do not have a broad spectrum of utility and applicability.

Even when a solvent type cement is suitable for a particular use, a problem is often encountered during storage due to gelling of the cement. This is a partial curing of the neoprene caused by the accelerators present. Often this problem is countered by using two parts cements wherein the two parts are separately stored and are mixed immediately before use. The disadvantages of this are apparent and single part, solvent type cements are still employed in many applications. The gelling problem is countered by discarding any cements more than about six months old or by storing the cements at about 40° F.

It is therefore a broad object of this invention to provide a solvent type polychloroprene cement having good adhesion and good physical properties over a broad temperature range and having a long shelf life.

Thus, there is provided in the practice of this invention according to a preferred embodiment, a rubber cement comprising polychloroprene, magnesium oxide, and zinc oxide dissolved and suspended in toluene. This material may also contain an anti-oxidant and anti-ozonant such as phenyl-alpha-naphthylamine. The cement achieves high physical properties without the addition of accelerators, retarders, sulphur, peptizers, reinforcing agents, fillers, plasticizers, or lubricants because of a prolonged grinding time. In a preferred embodiment the cement is ground in a ball or pebble mill for at least three days. The grinding effects complete dispersion of the solids in the toluene and apparently comminutes the magnesium oxide and zinc oxide to obtain a better cure. The cement so produced has excellent adhesion to a variety of substrates, is resistant to temperatures as high as 550° F., is flexible at −70° F. and is not subject to gelling or settling in a closed container for greater than nine months when stored at room temperature.

The polychloroprenes to which the present invention relates are compounds commonly known in commerce as neoprene. Neoprene is a name applied to polymers of 2-chloro-1,3-butadiene (chloroprene) and to copolymers of the same with diene or vinyl compounds such as acrylonitrile, butadiene, isoprene, dichlorobutadiene, and styrene in which copolymers the chloroprene is the predominant monomer. In particular the polychloroprene preferred in the practice of this invention is a high molecular weight polychloroprene having a uniform molecular weight distribution and in addition contains no sulphur, thiuram disulfide or other compound capable of decomposing to yield either free sulphur or a vulcanization accelerator. Less than 4% of the raw polymer has a molecular weight greater than about 750,000 and less than about 4% has a molecular weight less than about 45,000. Over 50% of the raw polymer has a molecular weight over 280,000 and about two-thirds of the polymer has a molecular weight between 150,000 and 550,000. A material having these properties is known commercially as Neoprene W and is available from E. I. du Pont de Nemours and Company, Inc., Wilmington, Del.

It is preferred that the polychloroprene cement have a composition having from one to five parts by weight of magnesium oxide per one hundred parts by weight of polychloroprene gum. When less than one part of magnesium oxide is employed the material is scorchy in milling and is too sensitive for large production handling. When the magnesium oxide is in excess of about five parts per one hundred parts of polychloroprene, there is a tendency to increase the curing time of the cement to an impractical extent. It is particularly preferred that the magnesium oxide be present as about four parts of magnesium oxide per one hundred parts of polychloroprene since this quantity is found to be sufficient to accept the hydrogen chloride evolved from the curing and is not a sufficiently large quantity to slow down the curing cycle.

It is preferred that the magnesium oxide employed be a high purity precipitated type of material rather than a ground calcined material. It is found that about 20% higher strength is obtained when precipitated magnesium oxide is employed rather than calcined magnesium oxide of the same original particle size. This is a material originally precipitated from sea water as magnesium hydroxide or chloride and heated to produce the oxide rather than produced by heating magnesium carbonate. The resultant magnesium oxide is of high purity and apparently has a large or particularly active surface which imparts improved physical properties to a cured cement. It is preferred that the particle size of all of the magnesium oxide mixed with the gum be less than about 0.25 micron and that about 90% be less than about 0.15 micron when originally mixed into the cement. Such a material is available from C. P. Hall Company, Akron, Ohio, under the trademark Megalite M.

It is preferred that zinc oxide be present in the composition in the range of from five to twelve parts by weight of zinc oxide per one hundred parts by weight of polychloroprene. Below about five parts of zinc oxide it is found that there is not a complete cure of the cement in a reasonable time period. Above about twelve parts zinc oxide it is found that the cement is dry and that the cured cement has an appreciably lower tooth particularly for heat cured cements. In a peel test the ability of a cement to resist peeling is directly related to the length of the stringers of cement between the two pieces being peeled. A cement having long stringers is referred to as having good tooth and exhibits good resistance to peeling. A dry cement has short tooth and relatively poor resistance to peeling. It is particularly preferred that zinc oxide be present in the cement as about five to eight parts by weight per one hundred parts by weight of polychloroprene. It is found that zinc oxide in this range gives a complete cure in a reasonable time period without any tendency to dry the cement and lower the physical properties. Above about eight parts by weight of zinc oxide makes the material more sensitive in heat curing although cold curing is still good and it is preferred to keep the zinc oxide content below eight parts to provide the most versatile cement. The optimum physical properties such as adhesion, peel strength and the like, at room temperature and at temperature extremes are found with this zinc oxide composition.

It is preferred that the zinc oxide be prepared by oxidation of vaporized pure zinc to give a fine, reactive zinc oxide since better cures are obtained with such material than with zinc oxide produced by other techniques such as heating zinc sulfide or zinc carbonate. The preferred zinc oxide is that produced by the so-called French process. It is preferred that the zinc oxide initially have a particle size of about 0.20 micron or less to provide a maximum of reactive surface.

It is also preferred that up to four parts by weight of anti-oxidant be incorporated in the cement per 100 parts by weight of polychloroprene to increase the resistance of the cured material to atmospheric oxidation and attack by ozone. It is preferred to employ phenyl-alpha-naphthylamine as the anti-oxidant since this material contributes some to the cure of polychloroprene. In compositions having low anti-oxidant content there is relatively poor resistance to oxidation of the cured material which limits the applicability of the composition to low oxygen environments. It is therefore particularly preferred that phenyl-alpha-naphthylamine or equivalent be present as three parts by weight per one hundred parts by weight of polychloroprene. This concentration is sufficient to give good oxygen and ozone protection without having an excess of uncombined material present in the cured composition. It is preferred that the anti-oxidant be present in less than about four parts per one hundred parts of polychloroprene since higher quantities show no appreciable improvement in resistance to oxygen and ozone and uncombined anti-oxidant would be present in the material as a diluent. In applications requiring exposure to vacuum or to foodstuffs or in confined atmospheres the presence of uncombined anti-oxidant when used in excess of four parts per hundred is a disadvantage.

Other anti-oxidants may be employed in addition to or in place of phenyl-alpha-naphthylamine such as phenyl-beta-naphthylamine or small amounts of metatoluylene diamine. Both of these materials exhibit a tendency to decrease the tooth of the cured cement and reduce the peel strength over that obtained with the phenyl-alpha-naphthylamine probably because of a lower tendency to contribute to the cure of the polychloroprene. Other anti-oxidants can be substituted as will be apparent to one skilled in the art. It is preferred, however, that any of the anti-oxidants or anti-ozonants employed be free of sulphur or sulphur containing radicals which may initiate gelling in the cement during storage.

It is preferred that the polychloroprene, magnesium oxide, zinc oxide, and anti-oxidant be dissolved and suspended in toluene to obtain a viscosity suitable for application as a cement. For most applications it is preferred that the toluene be present in the range of from about 350 to 600 parts by weight per one hundred parts by weight of polychloroprene. Certain additions may be made to the toluene, however, it is found that other solvents have a tendency to decrease the strength of the cured material even after evaporation of the solvents. Thus, for example, naphtha can be substituted for about 50% of the toluene without substantial decrease in strength. However, this material has a lower flash point than the toluene and is hence more dangerous. Above about 50% naphtha there is some settling of the milled cement from the solution and dispersion during storage. Similarly other materials can be substituted for a portion of the toluene, for example, xylene up to about 15%, ethyl acetate and the like up to about 5%, chlorinated hydrocarbons up to about 10%, benzene up to about 15%, gasoline up to about 10%, and heptane, hexane or pentane up to about 5%. Higher concentrations of any of these solvents in the toluene produce an acceptable cement for many purposes, but have a tendency to reduce the tooth of the cured cement.

In order to manufacture a cement having the formula above described the ingredients, except the solvent, are milled together according to conventional rubber milling procedures until the ingredients are thoroughly intermixed.

Thus, for example, the polychloroprene elastomer is thoroughly milled on a rubber mill until all crystallization is broken down and the material is smooth. Magnesium oxide is first added and thoroughly milled to prevent scorch in later additions. It is preferred to mill in the anti-oxidant next, followed by several cross cuts and end rollings to obtain uniformity throughout. If the elastomer is above about 140° F. it is sheeted out and cooled before zinc oxide is added by milling. After the zinc oxide is well milled into the gun, the elastomer is again cross cut and end rolled several times. The mixture is then sheeted off of the rubber mill in very thins sheets, preferably less than 0.030 inch. It is particularly preferred that the elastomer be sheeted off the rubber mill at a thickness of about 0.010 inch. The employment of thin sheets limits agglomeration of the elastomer in subsequent grinding operations. When the material is sheeted out of the rubber mill in thicknesses greater than the preferred thickness, it is found that an additional one to three days of grinding is required to complete the cement.

The sheeted material is shredded into small strips and placed in a pebble mill containing the desired quantity of toluene. The pebble mill also contains ceramic balls of various sizes including at least some small balls to obtain thorough grinding. The pebble mill is operated for a period of at least three days in order to get thorough dispersion of the magnesium oxide and zinc oxide in the neoprene solution. It is hypothesized that there is an appreciable reduction in size of both the magnesium oxide and zinc oxide in the pebble milling operation. This size decrease would increase the surface area available for reaction with the neoprene and would contribute to the high quality cures obtained. Even in the absence of comminution of the magnesium oxide and zinc oxide, continued grinding would reduce the size of any agglomerates of these materials and assure more uniform wetting of these materials by the neoprene solution. Long grinding in the pebble mill will also reduce any agglomeration of neoprene and more thoroughly distribute the elastomer. In very short grinds it is observed that visible lumps of neoprene remain. Longer grinds reduce these lumps below a visible size. It is hypothesized that the long grinds provided in the practice of this invention further reduce agglomeration of the neoprene even after the agglomerates are below visible size. This would cause more surface contact between the neoprene and metal oxides and promote stronger bonds.

It is found that the peel strength of bonds made with the described cement increases as a function of the grinding time in the pebble milling. The rate of increase is greatest up to three days of grind time and the strength continues to increase thereafter at a somewhat decreased rate up to about five days beyond which time no appreciable increase in strength has been noted in grinds up to eight days. It is preferred to employ a tumbling mill for the grinding operation, having balls or rods. Similarly grinding may be accomplished with stirred balls or the like. Other grinding techniques than a pebble mill may be employed, but the best results are obtained with a pebble mill grind which best effects a particle size reduction and thorough dispersion of the metal oxides. It is recognized, however, that a high speed blender or a hammer mill may be employed for the initial portion of the grind in order to decrease the time required to substantially completely dissolve the polychloroprene in the solvent and hence slightly reduce the overall grinding time. The difficulties of transferring the cement from the blender or hammer mill to the ball mill usually offset the small decrease in time obtained.

Thus the cement that is produced in the practice of this invention comprises polychloroprene and metal oxides for curing along with a small quantity of anti-oxidant, all dissolved or dispersed in a solvent which is preferably substantially toluene. This material is ground for at least three days in a ball mill and preferably is ground for about five days to obtain optimum peel strength. The material is free of accelerators such as diphenyl guanidine, heterocyclic amines, litharge, and sulphur bearing accelerators. In addition, since there is no requirement for an accelerator to obtain a cure, there is no requirement for a retarder to inhibit the action of the accelerator during storage of the cement. Because of the long grind good physical properties are obtained in the cured cement and cure is obtained in a reasonable time.

Additionally it is found that good adhesion of the cement is obtained without the requirement of addition of resins to improve tack. Thus, for example, the cement is free of phenol-formaldehyde resins, modified wood rosin, and the like. It has been found that although resins may improve the tack of the cement before curing they cause a tendency toward hardness and brittleness at low temperatures and seriously reduce the high temperature resistance of the cured composition. The long grinding time produces a smooth cement with adequate tack for good use as a cement for either hot or cold bonding. Since resins are not employed, there is no need to add plasticizers to the composition.

Since it is found that the cured cement has a high peel resistance and good strength there is no requirement for loading materials, reinforcing agents, fillers and the like such as carbon black, silica or asbestos fibers. It has been found that addition of silica, carbon black, or the like actually decreases the peel strength of the cured cement and the preferred composition is free of reinforcing agents. For example, as little as 1% silica causes a 5% drop in peel strength. The good properties of the cement are achieved without addition of accelerators, resins, reinforcing agents and the like because of simplicity of the composition permitting thorough reaction between the ingredients and a prolonged grinding time which thoroughly disperses the metal oxides employed in curing the polychloroprene.

After the cement is milled and ground for the preferred time in a pebble mill or the like, it may be enclosed in clean metal or glass containers and stored at room temperature for at least nine months and probably as long as two years without any gelling or any deterioration in the physical properties obtained upon curing. In order to employ the cement it may be applied to fabric as a coating by brushing onto the surface of the fabric or by dipping the fabric therein according to conventional coating techniques. A coating can be obtained with a single application of relatively viscous cement or by multiple applications of less viscous cement having a lower solids content. Generally it is preferred to employ a relatively less viscous cement for a first coat in order to thoroughly impregnate the fabric and a more viscous coat having a higher solids content for a final coating. It is preferred in coating fabrics to apply the coating and permit air drying until all odor of solvent is gone or for about 10 to 15 minutes between coats. The cement can also be applied by spraying on surfaces and is diluted by using a total of about 900 parts by weight of toluene when so applied.

When employing the cement as an adhesive it is preferable to apply several thin coats to both surfaces allowing about ten minutes drying time between coats. After the last coat of cement has been applied and dried for about ten minutes, the two pieces to be cemented are mated together and pressure applied to cause intimate surface contact. The cement is then cured to obtain maximum strength. Usually the pressure can be released during cure, however, it may be retained on the parts during cure without harm. The cement can be cured at room temperature and obtains a substantial proportion of its ultimate strength within about seven days, being virtually at full strength in ten days. It is found, however, that the cement increases bond strength with time up to about 90 days or possibly longer. In the alternative the cement may be completely cured with a hot bonding cycle employing a temperature of about 300° F. for 45 minutes preferably with a low pressure applied between the parts. Other bonding cycles based on the approximately rule that curing time can be halved for each 18° F. increase in temperature can be devised by one skilled in the art.

The preparation and application of compositions prepared in the practice of this invention are illustrated in the following non-limiting examples.

Example 1

Cement having 100 parts polychloroprene, four parts magnesium oxide, five parts zinc oxide, three parts phenyl-alpha-naphthylamine and 425 parts toluene was made by thoroughly milling 1600 grams of Neoprene W in a rubber mill until thoroughly broken down and smooth. Sixty-four grams of magnesium oxide was added and thoroughly milled in on the rubber mill to prevent scorch in the product. Forty-eight grams of phenyl-alpha-naphthylamine was next added and thoroughly mixed in. At this point the elastomer was cross cut three times each way and end rolled five times. The mill and the elastomer were cooled down to room temperature before eighty grams of zinc oxide were added. After the elastomer with zinc oxide added was apparently well milled, it was cross cut three times each way and end rolled nine times. The material was sheeted out at a thickness of about 0.020 inch and allowed to cool before shredding into a pebble mill for tumbling.

The mill employed was a ceramic jar having about three gallons capacity and a little less than half filled with ceramic balls. The balls were about ⅙ by weight of ¾ inch diameter, about ⅓ by weight of ½ inch diameter and the remaining ½ of ⁵⁄₁₆ inch diameter. The mill also contained 6800 grams of toluene. The ingredients and balls nearly filled the mill leaving only a small air space therein. The mill was tumbled for 72 hours at about 25 r.p.m. to produce a thorough dispersion and grind. After grinding, the cement was removed from the mill and stored in one quart clean metal containers, the yield being from 7½ to 8 quarts of cement. The uncured cement has a pink color and a viscosity of less than 65 seconds at 70° F. with a number 5 Zahn cup when tested according to ASTM Test Method D553. It has a solids content of about 22%. The cement is applied to fabrics by either brushing or dipping. A typical cement test technique employs Dacron fabric since this synthetic fabric is difficult to bond to. Dacron is a trademark of E. I. du Pont de Nemours and Company, Inc., Wilmington, Del., for fabric woven of fibers of polyethylene terephthalate. Before bonding the fabric is primed with Hylene M-50, another product of E.I. du Pont de Nemours comprising 50% solution of methylene bis (4-phenyl isocyanate) in monochlorobenzene. Preferably a 3 to 8% solution of Hylene M-50 in toluene is applied as a prime by either brushing or dipping.

Thus, for example, Dacron cloth was washed and heat set and brush coated with a 3% solution of Hylene M-50 in toluene. This was allowed to dry about one half hour. Five coatings of adhesive were applied by brushing, allowing ten minutes between coats for evaporation of solvent. After the last coat was dried for ten minutes, two pieces to be cemented were mated and rolled with a roller. These were air dried for an additional hour and placed in a platen press for curing. The cure cycle held the samples at 300° F. for 45 minutes with a pressure of about 50 p.s.i. on the joint. Alternatively, pieces of fabric are mated together, rolled and allowed to cure at room temperature with or without a small weight on the joint. Tackiness is reached in fifteen to twenty minutes and a peel strength of about fifteen to twenty pounds is reached within one day or less and the strength continues to rise for several days. The cement is also excellent for bonds of cured neoprene to cured neoprene or other materials. The tack is sufficient for metal to metal bonds although curing is slowed. Similar strengths are obtained for brush or dip coats of cement.

Dynamic peel strength of the cement is tested according to ASTM Test Method D1876 and involves a steady peeling rate with observation of the force required to cause peeling. The average force for a peel of about one inch of a strip one inch wide is employed as a measure of the peel resistance. The breakout load required to initiate peeling is also noted and with cement formulated as described breakout loads in excess of 75 pounds per inch width are common and loads in excess of 90 pounds per inch have been observed. Typical dynamic peel resistance values for several batches of cement were 33 pounds per inch, 37 pounds per inch, 42 pounds per inch, 36 pounds per inch.

Cement formulated as described has static peel resistance at 140° F. This test is performed with a constant ten pound load on a one inch strip. For purposes of fabric bonding it is arbitrarily considered acceptable if no more than one half inch of peeling occurs in thirty minutes at the test temperature. Many batches of cement having grind times of three days or more have passed this test. Additionally the cement described is flexible at −70° F.

Example 2

Cement having 100 parts polychloroprene, four parts magnesium oxide, six parts zinc oxide, three parts phenyl-alpha - naphthylamine and 425 parts toluene was made by combining 1600 grams Neoprene W, 64 grams magnesium oxide, 48 grams phenyl - alpha - naphthylamine, 96 grams zinc oxide and 6800 grams toluene in the same manner as described in Example 1, with a grind time of 72 hours in the pebble mill.

The cement so formed was used to bond electrical wiring to epoxy resin coated panels by means of glass fabric tapes one inch by two inches. The adhesive was brushed onto the glass fiber tape from three to five times with a fifteen minute drying time between each application. Fifteen minutes after the final application, the fabric retainers were pressed into place over the wire. It was found advantageous to roll the retainer with a rubber or steel wheel, or to press firmly with a piece of polytetrafluoroethylene to ensure intimate contact. The adhesive was allowed to cure for seven days at ambient temperatures prior to testing. The adhesive was tested for vibration, peel, and temperature resistance.

For vibration testing, the specimens were mounted in a conventional vibration fixture attached to a vibration exciter. They were subjected to fifteen minutes of random vibration exposure in each of the three orthogonal axes at the following intensities: from 0.007 g.$^2$/c.p.s. at 10 c.p.s. increasing logarithmically at 6 db/octave to 0.7 g.$^2$/c.p.s. at 100 c.p.s., and constant 0.7 g.$^2$/c.p.s. from 100 to 2000 c.p.s. All specimens were visually inspected after vibration testing and no changes in the physical appearance of the specimens were noted. These same specimens were subsequently subjected to peel, thermal shock and temperature resistance tests.

The thermal shock test involved cooling the specimen from room temperature to −320° F. by immersion in liquid nitrogen. After reaching thermal equilibrium, the specimens were plunged into room temperature water. While immersed in liquid nitrogen approximately twenty pounds per inch peel force was applied to the adhesive. None of the specimens showed any sign of peeling due to the loading and none popped off due to thermal shock. After thermal shock testing, all specimens had a peel resistance in excess of thirty pounds per inch Two specimens were dynamically peeled and showed peel strengths of 32 and 33 pounds per inch respectively.

Other specimens were subjected to temperature resistance tests. One of these tests comprised heating the specimen in air at 400° F. for ten minutes, at 450° F. for ten minutes and at 500° F. for ten minutes for a total exposure time of thirty minutes at elevated temperature. Other specimens were heated for ten minutes at 550° F. All of the specimens showed good adhesion and were still flexible after high temperature exposure.

Example 3

A series of tests was made to determine the effect of grinding time on the physical properties of a cement prepared according to the principles of this invention. A uniform composition was employed for this series comprising one hundred parts by weight of Neoprene W, four parts by weight of magnesium oxide, five parts by weight of zinc oxide, three parts by weight of phenyl-alpha-naphthylamine and four hundred parts by weight of toluene. The ingredients were milled together as described in Example 1, sheeted out and shredded into a pebble mill. The mill was tumbled for a period of time and the cement removed for testing. New batches of cement were made for each grind time rather than extracting a portion of the material from the mill.

The sement was applied by brushing to strips of Dacron fabric primed with Hylene M-50 as described. After curing, the dynamic peel resistance of the cement was tested according to ASTM Test Method D1876. The peel resistances in pounds per inch as found in these tests are set forth in Table I.

TABLE I.—DYNAMIC PEEL RESISTANCE OF CEMENT AS A FUNCTION OF GRINDING TIME

| Bond Cycle | Grinding Time (days) | | | | | |
| --- | --- | --- | --- | --- | --- | --- |
| | 1 | 2 | 3 | 4 | 5 | 6 |
| 7 Days, Room Temperature | 23 | 30 | 39 | 41 | 49 | 50 |
| 45 Minutes, 300° F | 26 | 28 | 33 | 34 | 39 | 39 |

It can be seen form these data that about 80% of the maximum strength of the material is achieved with a grinding time of three days. The full strength is reached with a grind of about five days. This is true for material that is heat cured or for cement that is cured at room temperature.

Example 4

A number of compositions of cements were prepared. These compositions were milled together as described in Example 1 and tumbled in a pebble mill for thorough mixing and grinding. The cements were applied by brushing to strips of Dacron fabric primed with Hylene M-50 as described. After curing, the dynamic peel resistance of the cement was tested according to ASTM Test Method 1876. The strips employed were one inch wide by about nine inches long and about one to two inches of the cemented area was tested at a time. The strips were retained so that data was accumulated showing the peel resistance of the bond as a function of the time after bonding. The compositions tested, the grinding time in the pebble mill, and the peel resistance of a hot bond and of a cold bond as a function of time after bonding is set forth in Table II. The anti-oxidant employed in these compositions was in each instance phenyl-alpha-naphthylamine.

utes were tested. The peel resistances in pounds per inch as determined in these tests are set forth in Table III.

TABLE III.—DYNAMIC PEEL RESISTANCE OF CEMENTS AS A FUNCTION OF GRIND TIME AND OF TIME AFTER BONDING

| Bond Cycle | Grind Time (days) | Time After Bond Made (days) | | | | | | | |
|---|---|---|---|---|---|---|---|---|---|
| | | 3 | 10 | 15 | 20 | 30 | 60 | 70 | 90 |
| Room Temperature | 3 | 42 | 55 | | | | 66 | | |
| Do | 5 | 24 | 32 | 41 | 49 | 52 | | 57 | |
| Do | 6 | 23 | 36 | 67 | 68 | | | | 70 |
| 45 Minutes, 300° F | 3 | 33 | 39 | | | 54 | 64 | | 68 |
| Do | 4 | 36 | | 44 | 49 | 55 | 60 | 60 | |
| Do | 6 | 39 | | | | | | 56 | |

It can be seen from these data that the bond strength increases as a function of time, even in bonds made by heating. Peel resistances in excess of 55 pounds per inch were found in all cases within about 60 days of bonding. This indicates continued curing and cross-linking is occurring.

TABLE II.—PEEL STRENGTH OF CEMENTS AS A FUNCTION OF COMPOSITION AND OF TIME AFTER BONDING

| Composition (parts/100 parts Neoprene W) | | | | Grind Time (days) | Strength (pounds of peel resistance/inch) | | | | | | | | | | | | Remarks |
|---|---|---|---|---|---|---|---|---|---|---|---|---|---|---|---|---|---|
| MgO | ZnO | Anti-oxidant | Toluene | | Days After Cold Bonding | | | | | | | | | | | Hot bond | |
| | | | | | 1 | 2 | 3 | 4 | 5 | 6 | 7 | 8 | 9 | 10 | 11 | 12 | |
| 4 | 7 | 3 | 400 | 2 | | | | | | 25 | 40 | | | | | 31 | 43# after 25 days. |
| 2 | 5 | 3 | 500 | 2 | | | | | | | | | | | | 31 | |
| 3 | 8 | 3 | 400 | 3 | | | | 35 | 40 | | | | | | | 51 | 44 | 54# after 28 days. |
| 3 | 10 | 3 | 400 | 3 | | | | | 25 | | | 28 | | 36 | | 25 | |
| 3 | 12 | 3 | 400 | 3 | | | | | 27 | | | 33 | | 42 | | | |
| 5 | 15 | 3 | 400 | 3 | | | | | 28 | | | 31 | | 38 | | 28 | |
| 2 | 12 | 3 | 400 | 3 | | | | 24 | | 34 | | | | | 60 | 25 | |
| 2 | 15 | 3 | 400 | 3 | | | | 22 | | 39 | | | | | 60 | 23 | |
| 2 | 10 | 3 | 400 | 3 | | | | 28 | | 35 | | | | | 63 | 23 | |
| 4 | 10 | 5 | 400 | 3 | | | | 27 | | 25 | | | | | 34 | 18 | |
| 3 | 9 | 3 | 400 | 3 | | | | | | | | | 40 | | | 55 | 36 | |
| 3 | 7 | 3 | 400 | 3 | | | | | | | | | 63 | | | 55 | 25 | |
| 3 | 8 | 4 | 400 | 3 | | | | | | | | | 46 | | | 60 | 30 | |
| 4 | 7 | 3 | 275 | 3 | | | | | 31 | | | | | 79 | | 79 | | Also 150 parts naphtha. |

It can be seen from these data that the strongest hot bonds are obtained with zinc oxide concentrations of eight parts or less. Additionally it is apparent that the strength of the bond is substantial within a week of bonding when no additional heat is applied.

Example 5

Samples of cement having a composition of one hundred parts by weight of Neoprene W, four parts by weight of magnesium oxide, five parts by weight of zinc oxide, three parts of weight of phenyl-alpha-naphthylamine, and 400 parts by weight of toluene, were prepared in the same manner as described in the above examples. Dacron strips were coated by brushing as described and dynamic peel resistance determined according to ASTM Test Method D1876. Samples were ground for different times and dynamic peel strengths determined as a function of the time after bonding. Both cold bonds made at room temperature and hot bonds made at 300° F. for 45 min- Example 6

Samples of several cements having a formula of a type preferred in the practice of this invention were made with added or substituted ingredients that are conventionally employed for improving adhesion, tack, curing rate or the like. The ingredients were compounded in the manner set forth in the above examples and dynamic peel testing was performed according to ASTM Test Method D1876. All bonds except that indicated were made between strips of Dacron fabric primed with Hylene M-50 as described. The peel strengths obtained after bonding at 300° F. for 45 minutes are set forth along with the compositions in Table IV.

TABLE IV.—EFFECT OF ADDITION OF PROCESSING AIDS TO POLYCHLOROPRENE CEMENT

| Composition (parts/100 parts Neoprene W) | | | | | Grind Time (days) | Hot Bond Strength (pounds/inch) | Remarks |
|---|---|---|---|---|---|---|---|
| MgO | ZnO | Phenyl-alpha-naphthylamine | Toluene | Other Materials | | | |
| 4 | 5 | 3 | 400 | 20 methylene bis(4-phenyl isocyanate), 20 monochlorobenzene. | 2 | 26 | 30# cold bond, 7 days. |
| 4 | 5 | | 400 | 3 polymerized trimethyl-dihydroquinoline, 1 tetramethyl-thiuram monosulfide. | 2 | 12 | Neoprene to Neoprene bond. |
| 2 | 5 | 3 | 500 | 1 dicumyl peroxide, 1 calcium carbonate | 2 | 14 | |
| 4 | 5 | 3 | 400 | 10 polyethylene powder | 3 | 20 | |
| 4 | 5 | 3 | 400 | 25 polyethylene powder | 3 | 15 | |
| 4 | 5 | 3 | 400 | 10 pale crepe natural rubber, 1.5 sulfur | 3 | 22 | |
| 4 | 5 | 3 | 400 | 1 1,3-diethyl thiourea | 2 | 7 | |
| 4 | 5 | 3 | 400 | 1.0 2-mercaptoimidazoline, 0.5 diortho tolylguandine. | 3 | 14 | |
| 4 | 5 | 3 | 500 | 2.0 silica, .75 2-mercaptoimidazoline, .75 benzothiazyl disulfide. | 3 | 23 | |
| 4 | 5 | 3 | 400 | 1.1 polyurethane elastomer | 3 | 14 | |
| 4 | 5 | 3 | 400 | 0.5 salicylic acid | 3 | 25 | 48# cold bond, 10 days. |
| 4 | 5 | 3 | 500 | 20 methylene bis(4-phenyl)isocyanate, 20 monochlorobenzene, 4 sulfur. | 2 | 10 | |

In addition to the data tabulated, it was observed that accelerators in the cement caused gelling thereof within a few months at room temperature. It was found that addition of Hylene M-50 directly to the cement contributed nothing to the bond to Dacron and decreased the overall strength of the cement below that obtained with the same composition without Hylene M-50. Tackifiers reduced the hot bond strength of the cement and reduced the high temperature resistance of the cured cement.

It is to be understood that the above described examples are merely illustrative of the application of the principles of this invention. Those skilled in the art may readily devise other variations that will embody the principles of the invention. It is therefore to be understood that within the scope of the appended claims the invention may be practiced otherwise than as specifically described.

What is claimed is:

1. In a method of making a solvent type rubber cement that is substantially free of accelerators, said cement comprising a mixture of polychloroprene rubber substantially free of sulphur bearing materials, sufficient zinc oxide having a particle size less than about 0.20 micron to promote a substantially complete cure of the cement, sufficient magnesium oxide having a particle size less than about 0.25 micron to accept hydrogen chloride evolved from the curing and sufficient organic solvent including at least 50% toluene to dissolve and suspend the solid ingredients to form a smooth stable mixture having a viscosity suitable for conventional application as a cement, the improvement comprising grinding the mixture for at least three days whereby substantial curing is obtained without accelerators.

2. A solvent type rubber cement substantially free of accelerators and resins comprising a polychloroprene rubber substantially free of sulphur bearing materials, sufficient zinc oxide having a particle size less than about 0.20 micron to promote a substantially complete cure of the cement, sufficient magnesium oxide having a particle size less than about 0.25 micron to accept hydrogen chloride evolved from the curing, and sufficient organic solvent including at least 50% toluene to dissolve and suspend the solid ingredients to form a smooth stable mixture having a viscosity suitable for conventional application as a cement.

3. A solvent type rubber cement substantially free of accelerators and resins comprising 100 parts by weight of polychloroprene rubber substantially free of sulphur bearing materials, from about 5 to 12 parts by weight of zinc oxide having a particle size less than about 0.20 micron, from about 1 to 5 parts by weight of magnesium oxide having a particle size less than about 0.25 micron, and from about 350 to 600 parts by weight of an organic solvent comprising at least 50% toluene.

4. In a method of making a solvent type rubber cement that is substantially free of accelerators and resins, said cement comprising a mixture of 100 parts by weight of polychloroprene rubber substantially free of sulphur bearing materials, from about 1 to 5 parts by weight magnesium oxide having a particle size less than about 0.25 micron, from about 5 to 12 parts by weight of zinc oxide having a particle size less than about 0.20 micron and from about 350 to 600 parts by weight of an organic solvent comprising at least 50% toluene, the improvement comprising:

grinding the mixture for at least about three days whereby substantial curing is obtained without accelerators.

5. A solvent type rubber cement that is substantially free of accelerators and resins comprising 100 parts by weight of polychloroprene rubber substantially free of sulphur bearing materials; from 5 to 8 parts by weight of zinc oxide having a particle size less than about 0.20 micron; from 1 to 5 parts by weight of magnesium oxide having a particle size less than about 0.25 micron; and sufficient organic solvent comprising at least 50% toluene to dissolve and suspend the solid ingredients to form a smooth stable mixture having a viscosity suitable for conventional application as a cement; and characterized by a dynamic peel strength in a polyethylene terephthalate fabric to polyethylene terephthalate fabric bond of at least 35 pounds per inch of bond width at room temperature; static peel resistance for 30 minutes at 140° F. of at least ten pounds per inch of bond width, at least nine months shelf life in closed containers at room temperature, flexibility at −70° F. and continued flexibility and adhesion after exposure to 500° F.

6. A solvent type rubber cement comprising 100 parts by weight of polychloroprene rubber substantially free of sulphur bearing materials about 92% of said rubber having a molecular weight between about 45,000 and 750,000; from 5 to 8 parts by weight of zinc oxide having a particle size less than about 0.20 micron; from 1 to 5 parts by weight of magnesium oxide having a particle size less than about 0.25 micron; and sufficient organic solvent comprising at least 50% toluene to dissolve and suspend the solid ingredients to form a smooth stable mixture having a viscosity suitable for conventional application as a cement; and substantially free of accelerators, resins, and reinforcing agents.

7. In a method of making a solvent type rubber cement that is substantially free of accelerators and resins the improvement comprising: grinding 100 parts by weight of polychloroprene rubber substantially free of sulphur bearing materials; about 4 parts by weight of magnesium oxide having a particle size less than about 0.25 micron; from 5 to 8 parts by weight of zinc oxide having a particle size less than about 0.20 micron; about 3 parts by weight of phenyl-alpha-naphthylamine; and from 350 to 600 parts by weight of toluene for at least three days in a pebble mill.

8. A solvent type rubber cement comprising 100 parts by weight of polychloroprene rubber substantially free of sulphur bearing materials; from 5 to 8 parts by weight of zinc oxide having a particle size less than about 0.20 micron; about 4 parts by weight of magnesium oxide having a particle size less than about 0.25 micron; from about 350 to 600 parts by weight of toluene; and substantially free of accelerators, resins and reinforcing agents.

9. A solvent type rubber cement consisting essentially of 100 parts by weight of polychloroprene rubber substantially free of sulphur bearing materials; about 4 parts by weight of magnesium oxide having a particle size less than about 0.25 micron; from 5 to 8 parts by weight of zinc oxide having a particle size less than about 0.20 micron; about 3 parts by weight of phenyl-alpha-naphthylamine; and from 350 to 600 parts by weight of toluene; and characterized by a dynamic peel strength in a polyethylene terephthalate fabric to polyethylene terephthalate fabric bond of at least 35 pounds per inch of bond width at room temperature; static peel resistance for 30 minutes at 140° F. of at least 10 pounds per inch of bond width, at least 9 months shelf life in closed containers at −70° F. and continued flexibility and adhesion after exposure to 500° F.

10. A cement as defined in claim 2 wherein said zinc oxide is present in the range of from about 5 to 8 parts by weight, and said magnesium oxide is present in the range of from about 1 to 5 parts by weight, both per 100 parts by weight of polychloroprene.

11. A cement as defined in claim 2 wherein said zinc oxide is present in the range of from about 5 to 8 parts by weight, said magnesium oxide is present as about 4 parts by weight, said solvent comprises about 350 to 600 parts by weight of toluene and further comprising about 3 parts by weight of phenyl-alpha-naphthylamine, all per 100 parts by weight of polychloroprene.

12. A process as defined in claim 1 wherein about two-thirds of said rubber has a molecular weight between about 150,000 and 550,000.

13. A cement as defined in claim 6 wherein about two-thirds of said rubber has a molecular weight between about 150,000 and 550,000.

14. A cement as defined in claim 13 wherein over 50% of said rubber has a molecular weight over about 280,000.

15. A cement as defined in claim 4 wherein said organic solvent is selected from the class consisting of toluene, naphtha, xylene, ethyl acetate, chlorinated hydrocarbons, benzene, gasoline, heptane, hexane, and pentane in the range up to about 900 parts by weight.

16. A rubber cement as defined in claim 8 wherein the polychloroprene has a uniform molecular weight distribution with less than about 4% of the raw polymer having a molecular weight greater than about 750,000 and less than about 4% of the raw polymer has a molecular weight less than about 45,000, over 50% of the raw polymer has a molecular weight over 280,000 and about two-thirds of the polymer has a molecular weight between about 150,000 and 550,000.

17. A rubber cement as defined in claim 9 wherein the polychloroprene has a uniform molecular weight distribution with less than about 4% of the raw polymer having a molecular weight greater than about 750,000 and less than about 4% of the raw polymer has a molecular weight less than about 45,000, over 50% of the raw polymer has a molecular weight over 280,000 and about two-thirds of the polymer has a molecular weight between about 150,000 and 550,000.

18. A method of making a solvent type rubber cement that is substantially free of accelerators and resins comprising:

blending 100 parts by weight of polychloroprene rubber, over 50% of the raw polymer having a molecular weight over 280,000 and about two-thirds of the polymer having a molecular weight between about 150,000 and 550,000 and substantially free of sulphur, thiuram disulfide and other compounds capable of decomposing to yield either free sulphur or a vulcanization accelerator; from about 1 to 5 parts by weight of magnesium oxide having a particle size less than about 0.25 micron; and from about 5 to 12 parts by weight of zinc oxide having a particle size of less than about 0.20 micron;

sheeting the blended materials off of a rubber mill at a thickness no greater than about 0.030 inch or less;

shredding the sheeted material into a pebble mill containing ceramic balls and an organic solvent selected from the class consisting of toluene, naphtha, xylene, ethyl acetate, chlorinated hydrocarbons, benzene, gasoline, heptane, hexane and pentane wherein toluene comprises at least 50% of the organic solvent, said solvent being present in the range of from about 350 to 600 parts by weight per 100 parts by weight of said polychloroprene; and grinding the mixture in the pebble mill for at least three days.

19. A process as defined in claim 18 wherein said blending step further includes blending in of an antioxidant up to 4 parts by weight per 100 parts by weight of said polychloroprene, said anti-oxidant being selected from the class consisting of phenyl-alpha-naphthylamine, phenyl-beta-naphthylamine and metatoluylene diamine.

References Cited

UNITED STATES PATENTS

| | | | |
|---|---|---|---|
| 1,967,292 | 7/1934 | De Holczer | 260—33.6 |
| 2,286,505 | 6/1942 | Perkins | 260—33.6 |
| 2,393,495 | 1/1946 | Tann | 260—33.6 |
| 2,918,442 | 12/1959 | Gerrard et al. | 260—33.6 |

ALLAN LIEBERMAN, *Primary Examiner.*